United States Patent [19]
McAlindon

[11] Patent Number: 5,473,325
[45] Date of Patent: Dec. 5, 1995

[54] ERGONOMIC HUMAN-COMPUTER INTERFACE APPARATUS AND METHOD

[76] Inventor: Peter J. McAlindon, 2260 River Park Cir., Apt. #821, Orlando, Fla. 32817

[21] Appl. No.: 105,361

[22] Filed: Aug. 11, 1993

[51] Int. Cl.$^6$ ..................................................... H03K 17/94
[52] U.S. Cl. ............................ 341/20; 200/6 A; 345/161
[58] Field of Search ..................................... 345/160, 161, 345/156, 167, 168, 171, 184; 341/20, 21, 22; 400/472, 481, 485, 486, 489, 492; 74/471; 200/6 A

[56] References Cited

U.S. PATENT DOCUMENTS

| | | | |
|---|---|---|---|
| 5,045,842 | 9/1991 | Galvin | 345/161 |
| 5,228,356 | 7/1993 | Chuang | 345/161 X |
| 5,230,059 | 7/1993 | Nielsen et al. | 345/161 X |

FOREIGN PATENT DOCUMENTS 0205726  12/1986  European Pat. Off. ............... 200/6 A

OTHER PUBLICATIONS

IBM Technical Disclosure Bulletin vol. 23 No. 2 Jul. 1980.

*Primary Examiner*—John K. Peng
*Assistant Examiner*—Thomas J. Mullen, Jr.
*Attorney, Agent, or Firm*—Allen, Dyer, Doppelt, Franjola & Milbrath

[57] ABSTRACT

An ergonomically developed, dome-shaped, alphanumeric interface apparatus for use with a electronic system, such as a computer or electric typewriter is described. The apparatus is configured in accordance with ergonomic principles and uses chording of both hands to type the characters of any user-defined alphabet. The device includes a set of domes that are shaped and contoured to conform to the shape of hands in a relaxed state and to distribute pressures across the splayed underside of the user's hand. Each dome is capable of movement in a plurality of discrete lateral sectors. The domes used together, utilizing a chording principle, can generate up to 144 characters depending on how many discrete movements are defined by the user. In a nonchording mode of operation, each dome is capable of producing up to 12 characters independently of the other dome. The two-handed implementation disclosed utilizes input movements that enable keystroke actuation via only slight arm or hand movement, no finger movement being required. In addition, cursor control is possible via either dome.

22 Claims, 5 Drawing Sheets

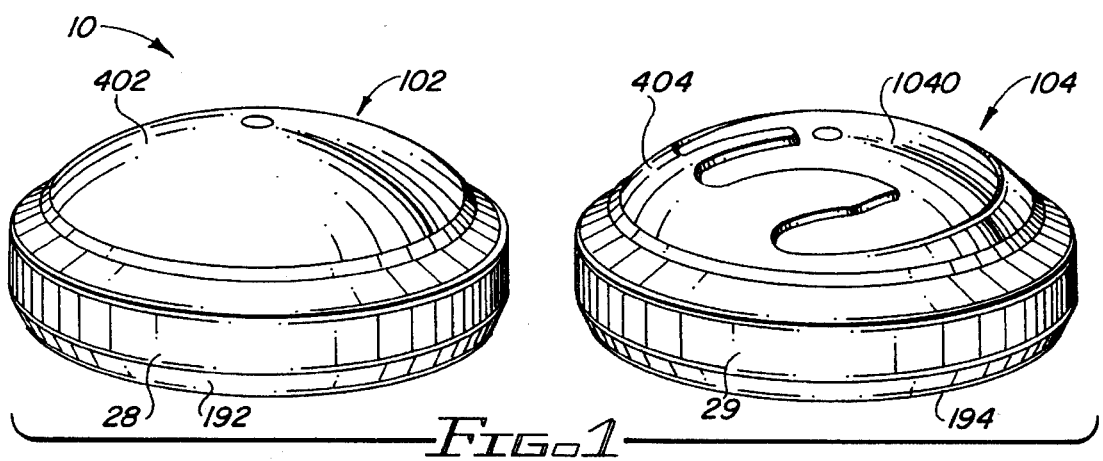
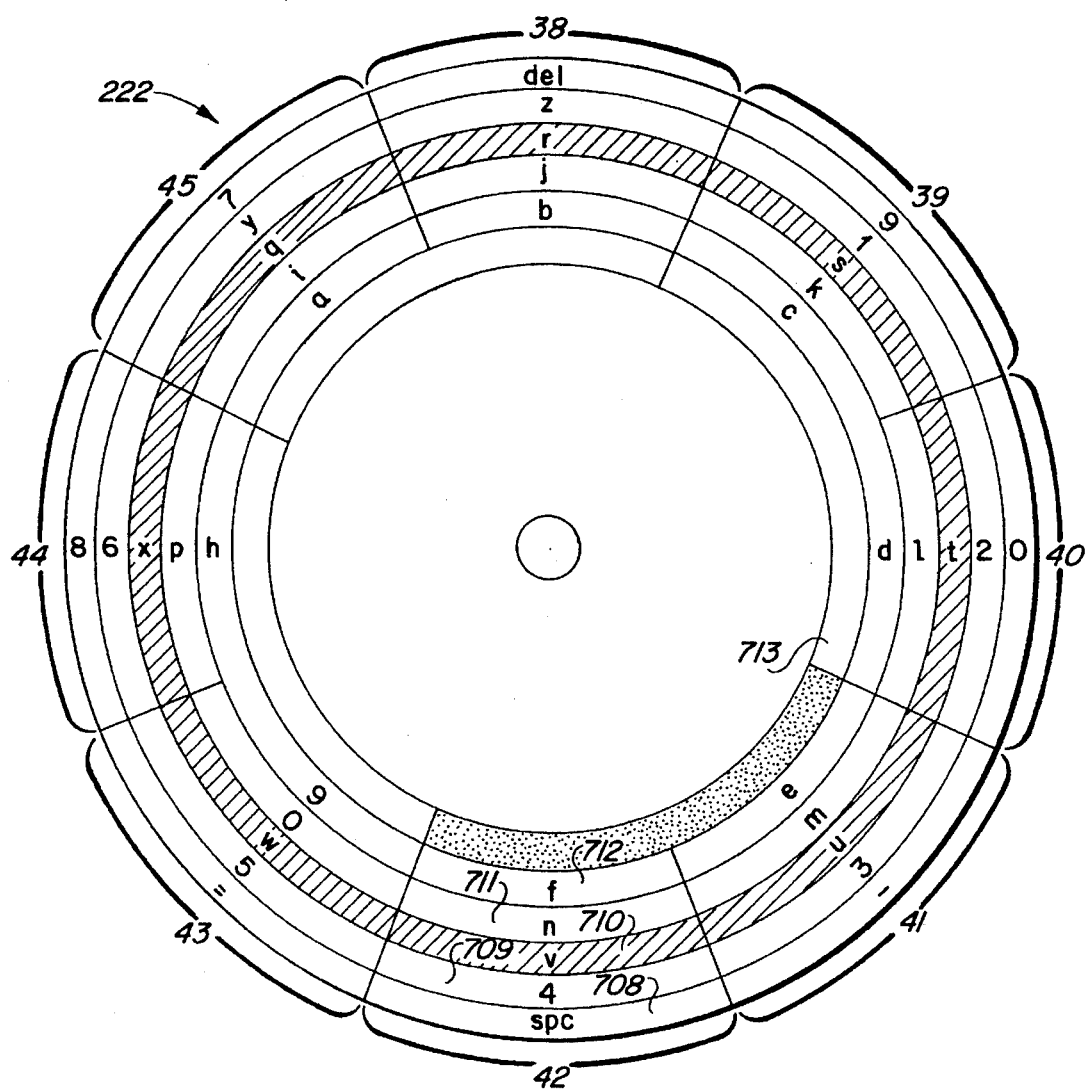

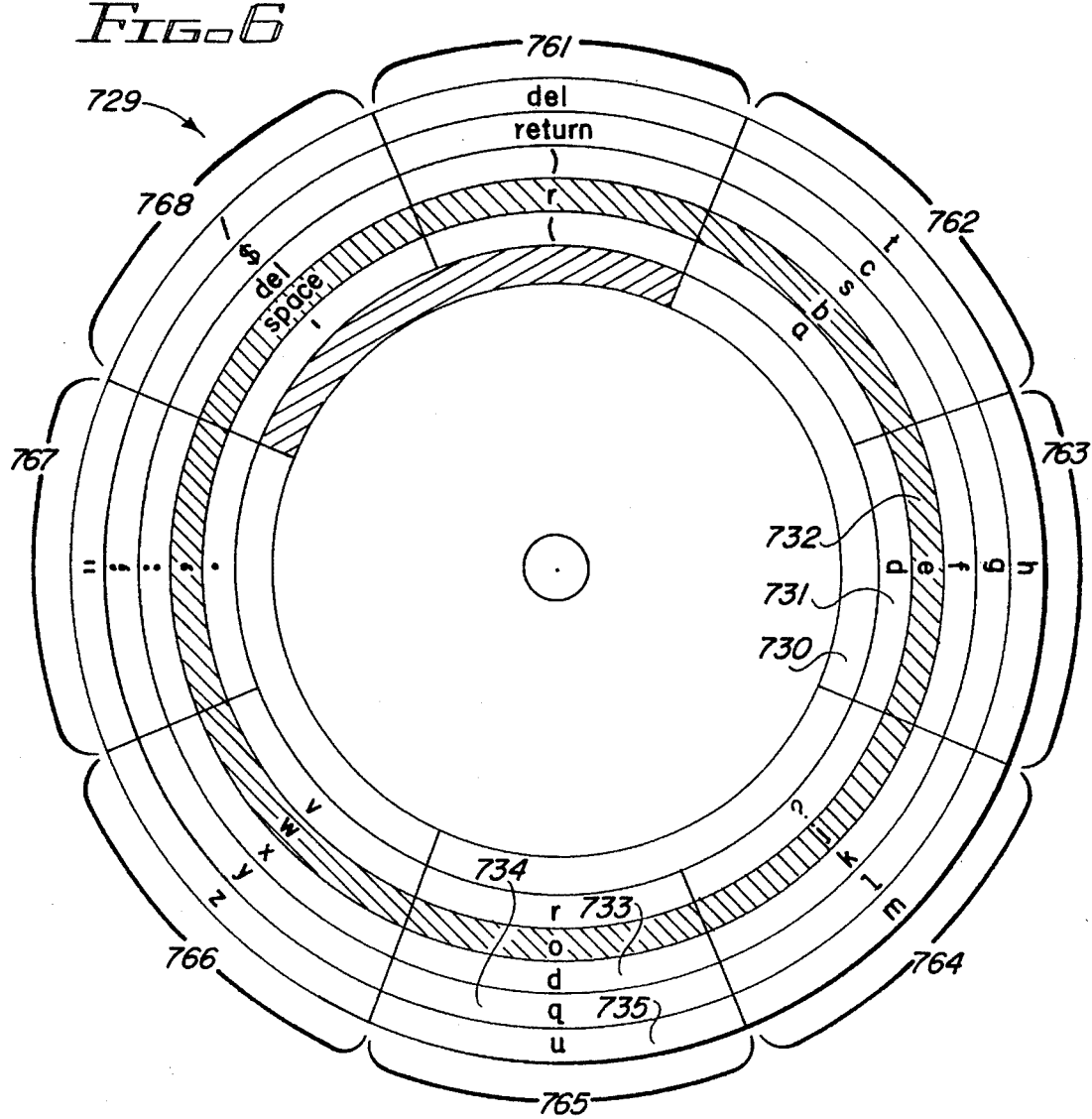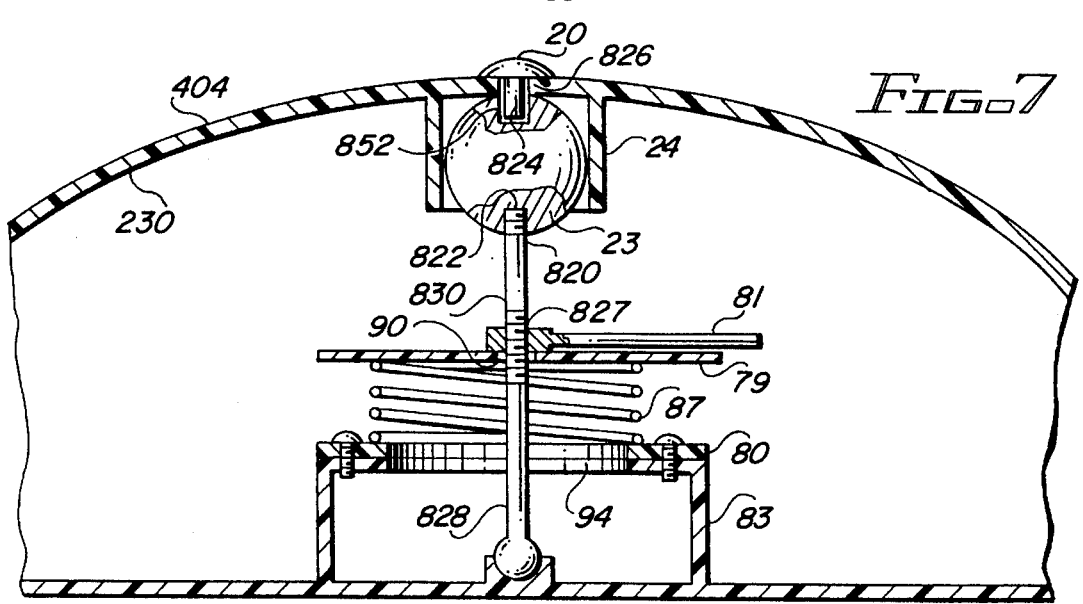

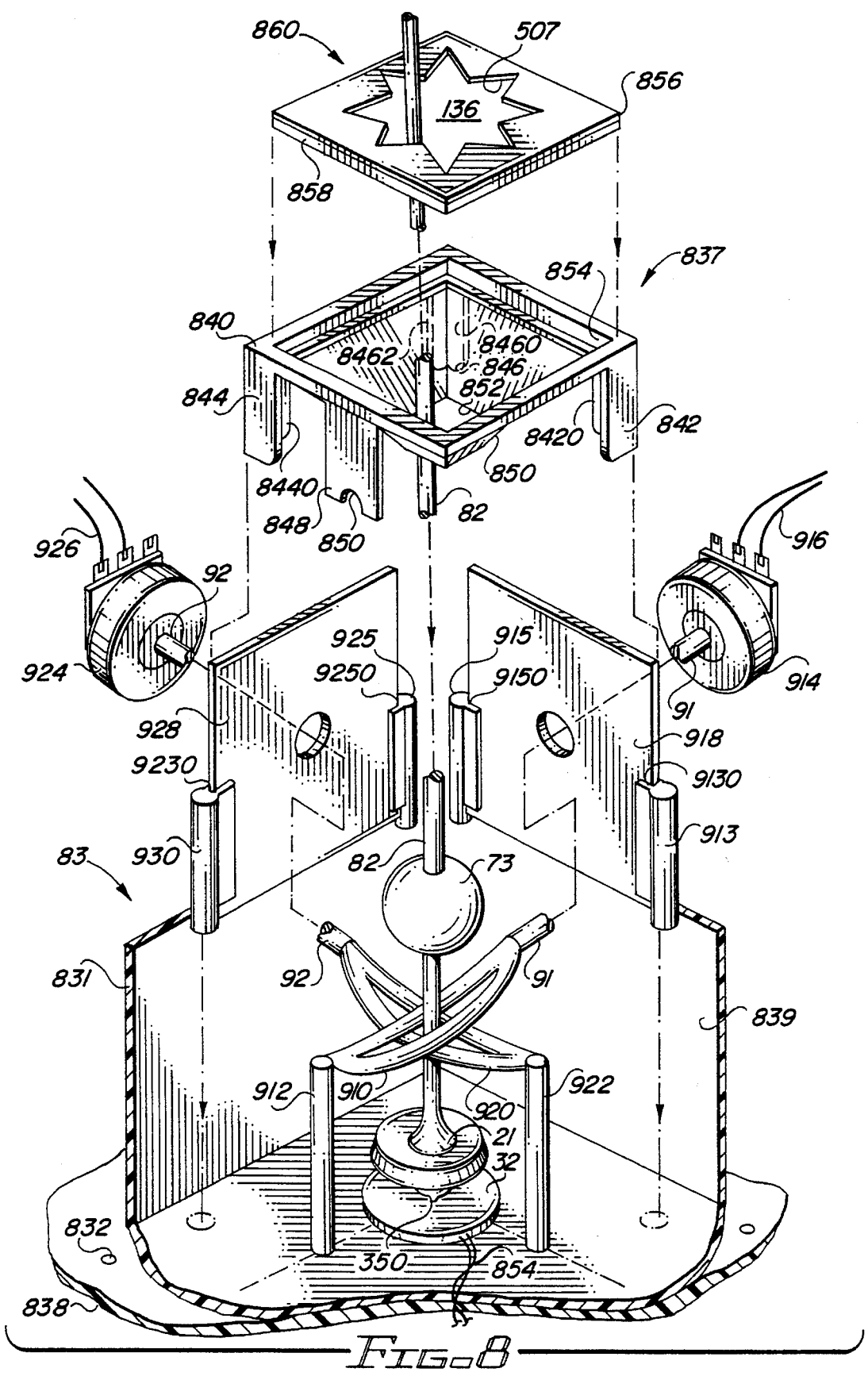

ERGONOMIC HUMAN-COMPUTER INTERFACE APPARATUS AND METHOD

BACKGROUND OF THE INVENTION

1. Field of the Invention

The present invention relates to a human-computer interface for data entry, and more generally to the field of data processing. In particular, it relates to a device that is ergonomically designed with reference to the architecture and functions of the human hand, wrist, and arm.

2. Related Art

The development of ergonomically designed keyboards has resulted from an increased awareness and identification of physical problems associated with the use of conventional typewriterlike keyboards. An ergonomically designed keyboard attempts to create a key layout that reduces finger travel and fatigue; promotes a more natural hand, wrist, and arm typing posture through design and support structures; or employs various key activation schema in order to enhance typing performance.

Due to the proliferation and availability of data entry systems, there has been a dynamic growth in the use of keyboard devices. Various annoying and debilitating muscular syndromes have accompanied this expansion, resulting from the repetitive and fatiguing hand, wrist, and finger motions that are required in the use of conventional typewriterlike keyboards. There has been a growing concern over neuromuscular injuries among clerical workers, journalists, computer programmers, and others who use computers or typewriters extensively. These injuries, one widely publicized of which is carpal tunnel syndrome, translate not only into pain and potential disability for the affected users, but also into significant loss of money, time, and productivity for businesses. Attention to these problems is not new in the art, as is evidenced by many serious attempts to alleviate keyboard-use "injuries" through innovative keyboard layouts and architectural designs.

Force, repetition, posture, rest, and stress are major factors to be considered in controlling and eliminating keyboard-related injuries (KRIs). Analysis of each factor, both independently and in relation to one another, is necessary in designing a keyboard that eliminates or reduces KRIs, force and repetition being perhaps the most important in the development of an ergonomically designed keyboard. Force is related to the musculature and conformation of the fingers and hands, which place limitations on their ability to perform a given task.

An abundance of human-computer interaction literature has suggested that some of the recently developed alphanumeric input devices may be more efficient, easier to learn, and may cause less physical trauma than conventional typewriterlike keyboards. Of these recently designed keyboards, most incorporate one or more design features that enhance typing performance and reduce or eliminate fatigue or injury. These design features include: (1) splitting the keyboard to minimize wrist deviations; (2) key contouring and flexible key mapping to minimize finger travel; (3) built-in hand and arm support; (4) a ternary capability in which keys rock back and forth to type; (5) a capability to rotate and tilt the device into numerous positions; and (6) a chordal capability, in which more than one key must be depressed for a single character to be output.

In reference to eliminating or reducing force and repetition fatigue factors, three approaches taken in the prior art are illustrated in U.S. Pat. No. 4,332,493, issued to Einbinder, U.S. Pat. No. 4,849,732, issued to Dolenc, and U.S. Pat. No. 5,178,477, issued to Gambaro.

Einbinder discloses a typewriter keyboard in which the keys are arranged to conform to the "footprint" of the human hand. This layout of keys is designed with topographically height- and angle-differentiated actuation pads that attempt to minimize overall hand and finger motion. However, the Einbinder device stresses the importance of having "home positions" for the finger and thumb tips, from which position the fingers, and therefore the hands, must travel appreciably in order to perform typical typing operations. Thus, the Einbinder device eliminates only a portion of the problem in solving the motion difficulties encountered with conventional keyboards.

Similarly motivated by safety-related concerns, Dolenc teaches a one-hand key layout that includes a fanlike array of plural keys distributed in elongated rows and organized for specific actuation by the thumb and four fingers of the hand. Dolenc's device is concerned with minimizing hand motion, but not finger motion. In fact, Dolenc speaks in terms of organizing keys in arrays in such a fashion that they take into account the "motion and range of the respective fingers of the hand." Thus Dolenc clearly considers finger tip actuation of each key. While Dolenc seriously addresses the issue of minimizing hand motion, his system does not appreciably contribute to minimizing finger motion, nor to related wrist motion. In addition, this device does not address the angular and topographical distinctions for individual keys, such as those described in the Einbinder patent. Dolenc also does not establish a "home position" for the tips of the fingers and thumb as did Einbinder.

Gambaro discloses an ergonomically designed keyboard that is organized with an array of keys that are disposed generally "to complement the splayed underside architecture of the user's hand." A two-handed implementation is disclosed wherein each array includes, for each finger of the hand, a cluster of input keys that are placed in such a manner that they enable key actuation via only "slight, gestural, relatively closing motion of a portion of a confronting finger, and for the thumb in each hand." In addition, this design tries to overcome ergonomic problems with a set of keys disposed within two adjustable "hand-print"-shaped depressions. No appreciable movement of the fingers from the fingertip down to immediately below the first finger joint is required, each finger being capable of accessing four keys for the middle, ring, and little fingers, eight keys for the first finger, and a multitude of keys for the thumb. Again, even though drastically reduced, finger movement is still required, and all fingers are required for full key set actuation.

Other issued patents that address modified keyboard and character arrangements include U.S. Pat. No. 4,244,659, issued to Malt, U.S. Pat. No. 4,509,873, issued to Ryan, U.S. Pat. No. 4,579,470, issued to Casey, U.S. Pat. No. 4,597,681, issued to Hodges, U.S. Pat. No. 4,655,621, issued to Holden, U.S. Pat. No. 5,006,001, issued to Vulcano, U.S. Pat. No. 5,017,030, issued to Crews, U.S. Pat. No. 5,029,260, issued to Rollason, U.S. Pat. No. 5,067,834, issued to Szmanda, U.S. Pat. No. 5,087,910, issued to Guyot-Sionnest, and U.S. Pat. No. 5,137,384, issued to Spencer. None of these addresses the issues of keyboard use and motion injuries.

Computing devices are regularly used for relatively long periods of time by people of all ages and abilities, it is becoming increasingly important that a device also accommodate the physically challenged. Prior art devices in general demand considerable manual and digital dexterity to operate, making them difficult for some portion of the population to utilize efficiently and effectively.

Two types of hand rests, both for partial and full hand support, have been identified in the prior art. One kind acts as an actuator and is not intended to support a substantial part of the weight of the hand, but instead to impart some function. Another type of hand rest known in the art serves only to space the fingers from the proximity-actuated keys to avoid accidentally operating the keys.

SUMMARY OF THE INVENTION

Dual Input Device Embodiment

Given the growing concern over keyboard-related finger and hand motion problems, it is an important aspect of the present invention to provide an ergonomic human-computer interface apparatus that obviates overuse injuries, with the primary focus on the entire aggregate of hand, wrist, and finger motions.

The apparatus in one embodiment comprises a pair of input devices, one for each hand. Each device comprises a base and a palm-engaging support in the shape of a dome that fits in close complementary relationship with the palmar architecture of the hand in a relaxed state. The dome is coupled through movable means to the device base, which is in the shape of a shallow cylinder having a bottom. The cylinder diameter is dimensioned so that the lower edge of the dome can be positioned beneath the top edge of the cylinder.

In one embodiment a rodlike member, or shaft, is connected to the center of the dome at one end and to the center of the device base at the other end, maintaining a substantially vertical "home" attitude when not under stress. When the dome is subjected to a rocking motion, the shaft also moves, and means are provided to sense the location of the shaft at a specified degree of rocking from the vertical position.

In the preferred embodiment, a plate is positioned above and affixed to the device base, the plate having an aperture in the shape of a star, the star-shaped aperture having a number of points. The coupling shaft passes through the star-shaped aperture and, when the dome is rocked sufficiently far, is moved into one of the star points. Means for registering shaft displacement are provided, which in turn generate a location signal. When a location signal is generated by each input device simultaneously, the pair of location signals is translated into a unique "keystroke" signal. It can be seen that the possible number of unique keystroke signals available is related to the number of star points in each input device; namely, it is equal to the number of star points in the right-hand input device times that in the left-hand input device. This combination of signals to generate a unique keystroke is called chording. The system of chording described here can be used to access a set of user-definable characters, which can then be manipulated into a form suitable for transmission to a computer or like electronic device. Although chording has been used in some prior art keyboards, the particular scheme of chording used in the present invention is unique.

An additional set of keystrokes is accessible by generating location signals from each input device used alone. The number of possible unique keystroke signals available in this way equals the number of star points in the right-hand device plus the number of star points in the left-hand device.

A conventional keyboard typically contains individual keys, each having the keystroke it represents imprinted thereon. An equivalent feature is disclosed here to assist the user in locating the sectors into which the domes must be rocked to produce a given keystroke. This comprises a color-coded annulus, one associated with each dome, which contains indicia that provide a correspondence between dome attitude and keystroke. This annulus is affixed to the top edge of the cylindrical device base wall, where it is visible by the user.

The invention described herein requires no appreciable hand or wrist motion and no finger motion, and since the rocking required is relatively small, only a slight motion of a user's arms is required to output a desired keystroke. More specifically, use of the proposed device requires little shifting of the hand from a rest position, and does not require wrist rotation for maneuvers that are performed on conventional keyboards by the four fingers and the thumb. Since the fingers are not required to perform any maneuvering for typing, instead of focusing on finger-tip activation, the present device is designed to call for only slight motion of a person's arm and/or hand for actuation of keystrokes.

A mechanism has been developed to allow users to adjust the tension associated with rocking the dome, that is, the stiffness associated with moving the coupling shaft. Users with heavy hands or larger muscles may prefer to set the dome tension to a higher setting than those with lighter hands or smaller muscles. No comparable tension control system is known in the art.

In addition, a switch is provided at the connection point of the shaft with the base. This switch is activated by applying vertical pressure to the dome. When the switch has not been depressed, a first set of unique keystroke signals is available, as described above. A single depression and release of the dome permits access to a second set of keystroke signals equal in number to the first set. For instance, the "shift" function may be accessed by a sequential depressing and release of one dome. The shift-lock can be activated by depressing each dome sequentially.

In another aspect of the present invention, special switching means is provided for selectively altering the location of a cursor. Two sequential depressions of either of the domes allows that dome to act as a positioning cursor. Because this activation can be performed on either dome, cursor positioning is permitted for either left- or right-handed users. No comparable cursor control system is known in the art. This type of built-in cursor, or "mouse," activation and control allows for total hand on-board typing and cursor control.

It should be noted that tension-adjustment means are also provided for the switching means for shift and cursor activation.

In another embodiment of the disclosed invention, palm and finger pads are provided on the dome to engage and support the hand. None of the prior art hand rests purports to support the hand while in motion, all having been specifically contoured to fit the shape of a static hand.

In order to permit maximum comfort, a mechanism is provided for tilting the device base about at least one axis. Thus the hands and wrists of the user can be maintained in their most relaxed position, with the domes tilted toward the user and away from the user's left-right midplane.

The present invention permits maximum flexibility in defining character location, activation force, activation displacement, and physical orientation of the keyboard; it can be used by a physically challenged individual because it will permit adaptation to his or her unique physical requirements. In addition, because finger movement has been totally eliminated, individuals with partial hand or finger paralysis or absence can still manipulate the device. The flexibility inherent in the positioning of the hands and arms will thus provide significantly improved ergonomic character.

Additional flexibility is provided in that variable dome sizes can be made to accommodate any user. In recognition that a "one-size-fits-all" approach may not be entirely appropriate to deal with users' hands that are significantly larger or smaller than a "median" hand size, the structure of the invention proposed herein permits different dome sizes to accommodate a range of hand sizes and finger spans. In addition, it can be appreciated by one skilled in the art that other ergonomically satisfactory shapes besides domes may be utilized, such as balls or flat boards.

The symmetry and function of the design allows for further reduction in the size of the bowl and other components, thereby making it an ideal candidate for miniaturization. Miniaturization of the keyboard has been up to this point a difficult task because of the need to accommodate human fingers. The invention described herein allows for easy miniaturization because the finger metrics are not considered as part of the design. In fact, one embodiment requires the use of only one finger, preferably the thumb, of each hand, to operate the apparatus.

Since the design contains no unitary "keys" requiring independent movement, it is possible to make the devices completely sealed to be weatherproof so that they are hostile-environment ready. Their design allows for total enclosure, and therefore protection, from water, dirt, dust, etc. No comparable air-tight system is known in the art.

Designing the device entailed an analysis of the functional capabilities of the hand and in particular how to eliminate finger movement. The capabilities were based on physical as well as physiological components of the musculature and dimensions of the hand. Using this information, a key and control layout was created around these capabilities, taking into account the hand's form and function, capitalizing on strengths and designing out weaknesses, especially in the fingers. The resulting design is uniquely natural and efficient, and is easy to learn and use.

Unitary Input Device Embodiment

It can be appreciated that another possible embodiment of the present invention comprises a unitary input apparatus as already described for one-handed operation.

A certain set of keystrokes is accessible by rocking the dome into the available signal-generating sectors, the number of keystrokes available being equal to the number of sectors. In addition, chording is possible with the use of the switching means described above. In this embodiment, the user rocks the dome into one sector, simultaneously depressing the dome sufficiently to activate the switching means. While maintaining vertical pressure on the dome, the dome is returned to the "home" position, and then rocked into a second sector. The signals generated by the motion of the dome (and hence the coupling shaft) are then "chorded" in a similar fashion to that utilized in the dual input device embodiment.

Objects of the Invention

The disclosed invention converts movements of the dome into electrical signals. Although the use described here is given in terms of keystrokes input to a computer, it can be electrically interfaced to a typewriter, word processor, printer, or other like implement so that its electrical signals can be utilized to control the operation of such devices.

It is an object of this invention to provide an ergonomically designed input device that does not contribute to overuse injuries of the wrist and hand. In fact, the disclosed apparatus reduces or eliminates finger and wrist fatigue factors associated with force and repetition.

It is a further object to disclose a dome-shaped apparatus that conforms to the shape of the human hand, requires no finger movement, and can be adapted to the size and strength of an individual's hand. Additional flexibility is provided in that adjustment in the range of dome movement needed to achieve keystroke generation is possible.

It is yet another object to present a dome-shaped apparatus that can be used by the physically challenged.

It is an additional object to disclose a system of chording in association with either a single or a pair of dome-shaped input devices that can be used to define up to 144 characters.

It is also an object to provide palm and finger pads on the dome-shaped device to support the hand both while at rest and in motion.

It is a further object of this invention to disclose a cursor positioning system that can be activated by sequential depressions of either of a pair of dome-shaped input devices.

It is yet another object to present an environment-proof character input system.

It is a final object to describe a dome-shaped system that can be miniaturized or designed for operation with one hand.

The features that characterize the invention, both as to organization and method of operation, together with further objects and advantages thereof, will be better understood from the following description used in conjunction with the accompanying drawings. It is to be expressly understood that the drawings are for the purpose of illustration and description and are not intended as a definition of the limits of the invention. These and other objects attained, and advantages offered, by the present invention will become more fully apparent as the description that now follows is read in conjunction with the accompanying drawings.

BRIEF DESCRIPTION OF THE DRAWINGS

FIG. 1 is a perspective view of the keyboard, constituting a preferred embodiment of the invention, having two domes shaped to fit the natural shape of the hands at rest. The right-hand device further illustrates a palm-shaped depression for engaging the hand.

FIG. 6 depicts the character definition ring for the single input device embodiment.

FIG. 7 illustrates details of the coupling shaft's attachment to the dome and tension-changing apparatus.

FIG. 8 indicates the details of the transducer structure.

DETAILED DESCRIPTION OF THE PREFERRED EMBODIMENT

Figure 2B:
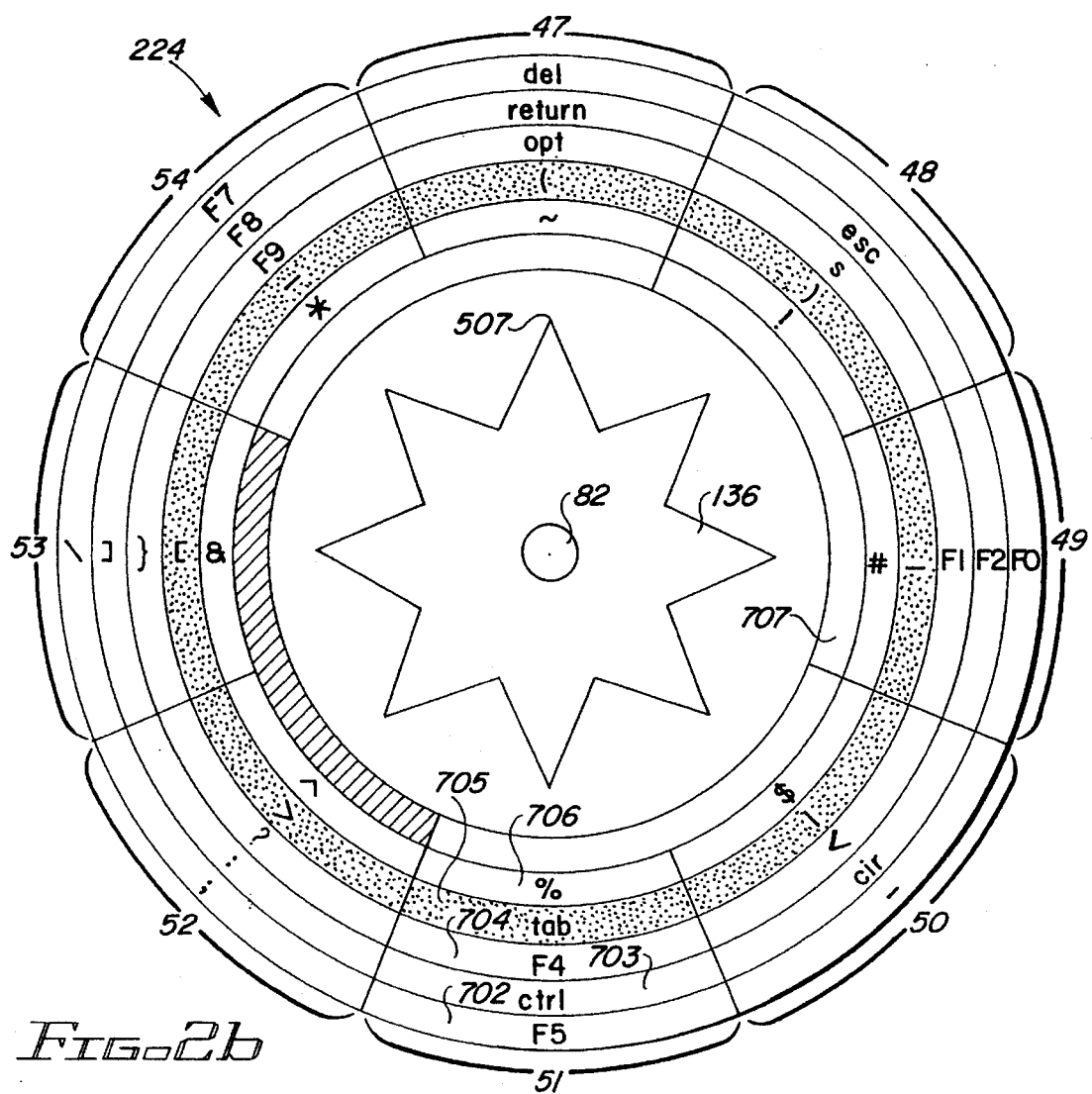
FIG. 2 is a plan view of the apparatus depicted in FIG. 1, with the domes removed, illustrating the character definition rings, with FIG. 2a illustrating the left-hand side and FIG. 2b illustrating the right-hand side.

The preferred embodiment of the present invention will now be described with reference to FIGS. 1–8.

Description of the Apparatus

Referring to FIG. 1, there is indicated generally by the numeral 10 an ergonomically designed interface apparatus for entering information by a human operator to a suitable electronic system (not shown) such as a computer. The coupling arrangement between apparatus 10 and the computer, which entails an electronic device coupled with an electronic alphanumeric device, is well known to those skilled in the art. As it forms no part of the present invention, this coupling is omitted from the present discussion.

In accordance with the underlying objects to which the present invention is directed, device 10 takes on a sculpted form that is intended to complement closely the typical palmar architecture of the human hand at rest. Accordingly, apparatus 10 has bilateral symmetry, which can be seen in FIG. 1, with a left-hand device 102, which conforms to a user's left hand, and a right-hand device 104, which conforms to the user's right hand. In one embodiment, a hand-shaped depression 1040, shown on right-hand device 104, is formed in each device to aid in positioning and improving comfort.

Devices 102 and 104 are secured to bases 28 and 29, respectively, and the bases are supported by tilting units 192 and 194, respectively. All of these structures in the preferred embodiment are formed of molded plastic.

For illustration purposes, right-hand input device 104 will be described in detail with reference to FIGS. 3–5, 7, and 8. Device base 29 in the preferred embodiment comprises a shallow truncated cylinder with a bottom. The device base wall includes a cylindrical portion 296, flared portion 299, and bottom 298 to create an interior space dimensioned to permit the lower flared edge 297 of dome 404 to fit within the space. This dome edge 297 is supported in close proximity to (but not in contact with) reversible plate 18, which has a flat bottom 184 and a curved top 182. The function of plate 18 will be described later. Surrounding dome 404 and affixed to the top edge 295 of wall 296 is an annular-shaped character definition ring 224 (see also FIG. 2b), the structure of which will be described below and the use of which will be described in the section on the method of use.

In an embodiment suitable for hostile environments, input device 104 can be completely sealed and air-tight. This is accomplished by attaching one edge of a rubberized expandable gasket 103 around the lower edge 297 of the dome 404 and the other edge of gasket 103 to plate 18. Gasket 103 is sufficiently flexible to enable the working of dome 404 (see FIG. 3), which may be accomplished by using an accordion pleated gasket.

Dome 404 is coupled (see FIG. 7) to device base 29 via a shaft 82 that is attached at its threaded upper end 820 into ball 23, which has a corresponding threaded hole 822 drilled therein. Ball 23 fits inside cubic receptacle 24 on the underside 230 of dome 404. Removable button 20 having protrusion 824 is placed atop dome 404, the protrusion 824 passing through a hole 826 in dome 404 and into a hole 825 in ball 23.

Shaft 82, when button 20 is in place, has a movable character so that a rocking of dome 404 is possible, the rocking causing an angular deflection of shaft 82, which when not under tension resides in a substantially vertical "home" position. Rocking motion is permitted by the lower edge 297 of dome 404 protruding over curved surface 182 of plate 18; thus the lower edge 297 is not limited by plate 18.

It can be seen that removing button 20 from dome 404 will enable ball 23 to rotate freely within receptacle 24. Therefore, if plate 18 is inverted from the position shown in FIG. 3, a flat surface 184 is presented to dome 404. In this case, movement of shaft 82 is accomplished by sliding dome 404 across plate 18. In this case rocking would not be possible because lower edge 297 of dome 404 would strike surface 184 of plate 18.

The tension parameter associated with such a rocking motion can be adjusted with the use of a mechanism comprising a spring 87, two circular metal disks 79 and 80, and a threaded lever arm 81. Spring 87 is sandwiched between two solid disks 79 and 80 having holes 90 and 94, respectively, in their centers, shaft 82 passing through the center of the spring and through holes 90 and 94, which are dimensioned to allow for shaft 82 movement. Lower disk 80 is fastened to the top of transducer structure 83. Spring 87 and upper disk 79 are not affixed to any structure; they are held in place by shaft 82 running through the holes 90 and 94 in their centers. Lever arm 81 has a hole 827 threaded on its interior surface, through which shaft 82 passes. Shaft 82 has a corresponding threaded portion 830 that retains lever arm 81 in position, which thus retains upper disk 79 in position. It can be seen that screwing lever arm 81 clockwise will compress spring 87 and thus increase the tension associated with moving shaft 82, and, hence, with rocking dome 404. Increasing the tension also leads to an increase in force required to activate switch 85, the operation of which will be described later.

Figure 3:
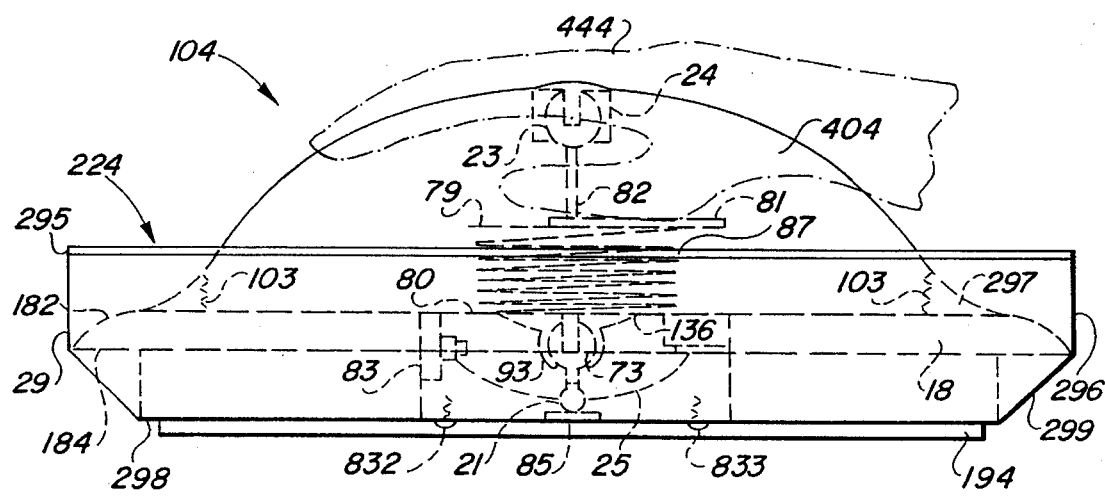
FIG. 3 is a vertical cross-sectional view of the apparatus depicted in FIG. 1, also illustrating generally how a user's right hand is placed in an operative position.

FIG. 3 shows an operator's hand 444 positioned atop dome 404. Angular deflection of shaft 82 can be seen to cause a motion of ball-shaped member 73, which is mounted on shaft 82 below disk 80. Ball 73 forms part of transducer structure 83, which is affixed to device base bottom 298 by fasteners 832. After passing through ball 73, shaft 82 terminates in a rounded tip 21, which rests on the top surface of switch plate 85.

Transducer structure 83, resides within support structure 831, as shown in FIG. 8. Transducer structure 83 has a base 838 and four walls 839, in the preferred embodiment a unitary molded plastic housing. Ball 73, through which passes shaft 82, moves laterally when dome 404 is rocked. This motion is converted into a location signal by the workings of transducer structure 83, the basics of which are known in the art, being similar in nature to the mechanism utilized in the human-computer interface device known as a "joystick."

In this embodiment ball 73 fits into pyramidal depression 851 in aperture housing 837, to be described in the following. Ball 73 can move freely within this depression 851. Cradling ball 73 are a first 91 and a second 92 sway arm, each having a distal end and a proximal end relative to ball 73. Sway arms 91 and 92 form a substantially 90 degree angle to each other. Sway arm 91 comprises a substantially semicircular portion 910 at the proximal end, this portion being longitudinally split so as to permit shaft 82 to protrude therethrough; likewise for semicircular portion 920 of sway arm 92. The proximal ends of sway arms 91 and 92, at which the splits are rejoined, are rotatably affixed to support legs 912 and 922, respectively, which are an integral part of and protrude upwardly from the base 838 of support structure 830.

The distal portion of sway arm 91 comprises a substantially straight section that begins adjacent ball 73, the straight portion being substantially parallel with support structure base 838. This straight portion proceeds through holes in support plates 918 and 928, respectively, where they are rotatably affixed to first and second potentiometers 914 and 924, respectively, which translate the motion of sway arms 91 and 92, respectively, into first and second potentiometer signals. These signals are transmitted via leads 916 and 926, respectively, to a circuit where they are then translated via software means into a location signal. This allows a computer or other electronic device to sense the action of dome 404. Since this transduction method is software controlled, it can be seen that the amount of shaft 82 motion needed to output a location signal can be adjusted. In practice this parameter, which is altered physically by inserting aperture members 860 having different-sized apertures 136 (vide infra), can vary from 0.05 to 2.5 cm.

Support plates 918 and 928 are rectangular, planar members that are affixed to support structure 831 at roughly 90 degrees to each other, with ball 73 being substantially in the center of this angle. Two legs 913 and 915, upwardly extending from base 838 and integrally molded with support structure 831, contain grooves 9130 and 9150 into which support plate 918 is slidingly engaged. Likewise two legs 923 and 925 contain grooves 9230 and 9250 into which support plate 928 is slidingly engaged. Support legs 913, 915, 923, and 925 are each approximately one-half the height of support plates 918 and 928. In addition to supporting potentiometers 914 and 924, support plates 918 and 928 contain spring-loaded mechanisms (not shown) for returning sway arms 91 and 92, respectively, and hence shaft 82, to their vertical "home" position.

Aperture housing 837, shown in FIG. 8, is supported in relation to ball 73, with shaft 82 passing therethrough, in the following manner. Housing 837 is a molded plastic structure having a square frame 840 from three corners of which depend downwardly protruding legs with grooves therein positioned to slidably engage support plates 918 and 928. Leg 844 has groove 8440 to engage plate 928 and is dimensioned to rest upon upwardly extending leg 923. Leg 842 has groove 8420 to engage plate 918 and is dimensioned to rest upon upwardly extending leg 913. Leg 846 has two grooves at 90 degrees to each other: Groove 8462 engages support plate 928 and groove 8460 engages support plate 918. Leg 846 is dimensioned to rest on legs 915 and 925. Further support is provided by support member 848, which extends downward from the side of housing 837 between leg 844 and the corner of frame 840 from which no leg depends. Support member 848 has a semicircular groove 850 at its bottom end that is dimensioned to rest upon support arm 910. In addition, housing 837 has two grooves on its lower surface (not shown) dimensioned and positioned to engage support plates 918 and 928.

Housing 837 further comprises an inverted pyramidal depression 851 in its center. In the center of pyramidal depression 851 is an aperture 852 dimensioned to permit free motion of shaft 82 therein. Surrounding depression 851, on the top surface of frame 840, is groove 854.

Aperture member 860, containing star-shaped aperture 136, which has eight points in the most preferred embodiment, is constructed and positioned as follows. Aperture plate 856, having star-shaped aperture 136 in its center, is placed over shaft 82, shaft 82 passing through aperture 136. Downwardly projecting lip 858 is integrally molded with and circumscribes aperture plate 856. Aperture plate 856 and lip 858 are dimensioned so that lip 858 fits snugly into groove 854 in the top of aperture housing 837.

Star-shaped aperture 136 defines the possible movement of the shaft 82 in the following manner. As dome 404 is rocked, an angular displacement is induced in shaft 82. Angular displacement of shaft 82 can be induced only to the extent of shaft 82 reaching one of the eight star points 507. Thus each of the star points 507 creates a "stop" to shaft 82 movement. The extent of shaft 82 displacement needed to reach one of these "stops" defines the point at which potentiometers 914 and 924 output a location signal.

The eight-position star can be easily replaced with any aperture having from two to twelve points, and, in addition, the size of the aperture can be varied. Since the transduction of angular displacement into a location signal is software controlled, there is virtually unlimited flexibility inherent in this system.

Shaft 82 travels freely through ball 73 in the vertical direction to allow activation of switch button 85, which is used to enable cursor control (a "mouse") and to signal a "shift" operation. Switch button 85 is affixed atop the base 838 of structure 830 and immediately beneath but not in contact with the rounded tip 21 of shaft 82. When shaft 82 is depressed via dome 404 being pushed downward and then released, tip 21 activates button 85, which in turn depresses button 350 beneath base 838. Button 350 in turn is positioned atop and makes contact with switch plate 32, which registers activation via lead 854. In this embodiment, a single activation of switch button 85 outputs a "shift" signal; a dual activation enables access of the cursor control function. When the single input device embodiment is desired, the switching means further permits the user to "chord" two location signals from one input device to create a keystroke, as will be discussed in the method section.

FIG. 2b illustrates a plan view of apparatus 104 with dome 404 removed. Shaft 82 passes through the center of star-shaped aperture 136. The previously described rocking motion of dome 404 induces a movement of shaft 82 into one of the star points 507. Character definition ring 224 provides indicia that, when used either alone or in concert with character definition ring 222 on the left-hand input device 102, provide a correspondence between dome attitude and the keystroke generated. (See section on method of use.) In this embodiment, eight radially disposed sectors 47, 48, 49, 50, 51, 52, 53, and 54 on character definition ring 224 correspond to the eight star points 507. Intersecting radial sectors 47–54 are five concentric rings 702, 703, 704, 705, and 706 on character definition ring 224, forming a grid that defines the keystroke characters shown on FIG. 2b. A sixth innermost ring 707, divided into four sectors, serves as a selector ring, whose use will be described in the section on method of use.

The apparatus 102 provided for the user's left hand in device 102, appearing on the left-hand side of FIG. 1, is, generally speaking, a mirror image of what has just been described for the right-hand side of FIG. 1. In an analogous manner to the construction of character definition ring 224 for the right hand is character definition ring 222 for the left hand. Radially disposed sectors 38, 39, 40, 41, 42, 43, 44, and 45 intersect five concentric rings 708, 709, 710, 711, and 712, forming a grid that defines the keystroke characters shown on FIG. 2a. The sixth innermost ring 713, divided into four sectors, serves as the left-hand selector ring.

In the preferred embodiment the rings are color coded to aid the user in keystroke production. For the selector and keystroke ring combination described here and shown in FIGS. 2a and 2b, nine distinct colors would be needed, with colors 1–4 appearing on the four radial sectors of left-hand selector ring 713 and colors 5–8 appearing on the four radial sectors of right-hand selector ring 707. Each of colors 1–4 then appears on one of the right-hand concentric rings 702–705; likewise, each of colors 5–8 appears on one of the left-hand concentric rings 708–711. The ninth color appears on both outermost rings 706 and 712. Illustrative examples of this color coding are provided on FIGS. 2a and 2b, wherein diagonal hatching indicates the disposition of color 1 and dotting indicates the disposition of color 5.

When it is desired to use a single input device, character definition ring 729 as shown in FIG. 6 is utilized. In this embodiment, five distinct colors are needed, and six concentric rings are provided, divided into sectors in exactly the same manner as for the dual input device embodiment. Colors 1–4 appear on the four sectors of selector ring 730. The five outer rings are divided into eight sectors 761–768. Each of these same colors 1–4 then also appears on one of the four concentric rings 731–734. The fifth color appears on the outermost ring 735. Two motions are then required to access a single keystroke appearing on rings 731–734, as will be described in the method section.

Figure 4:
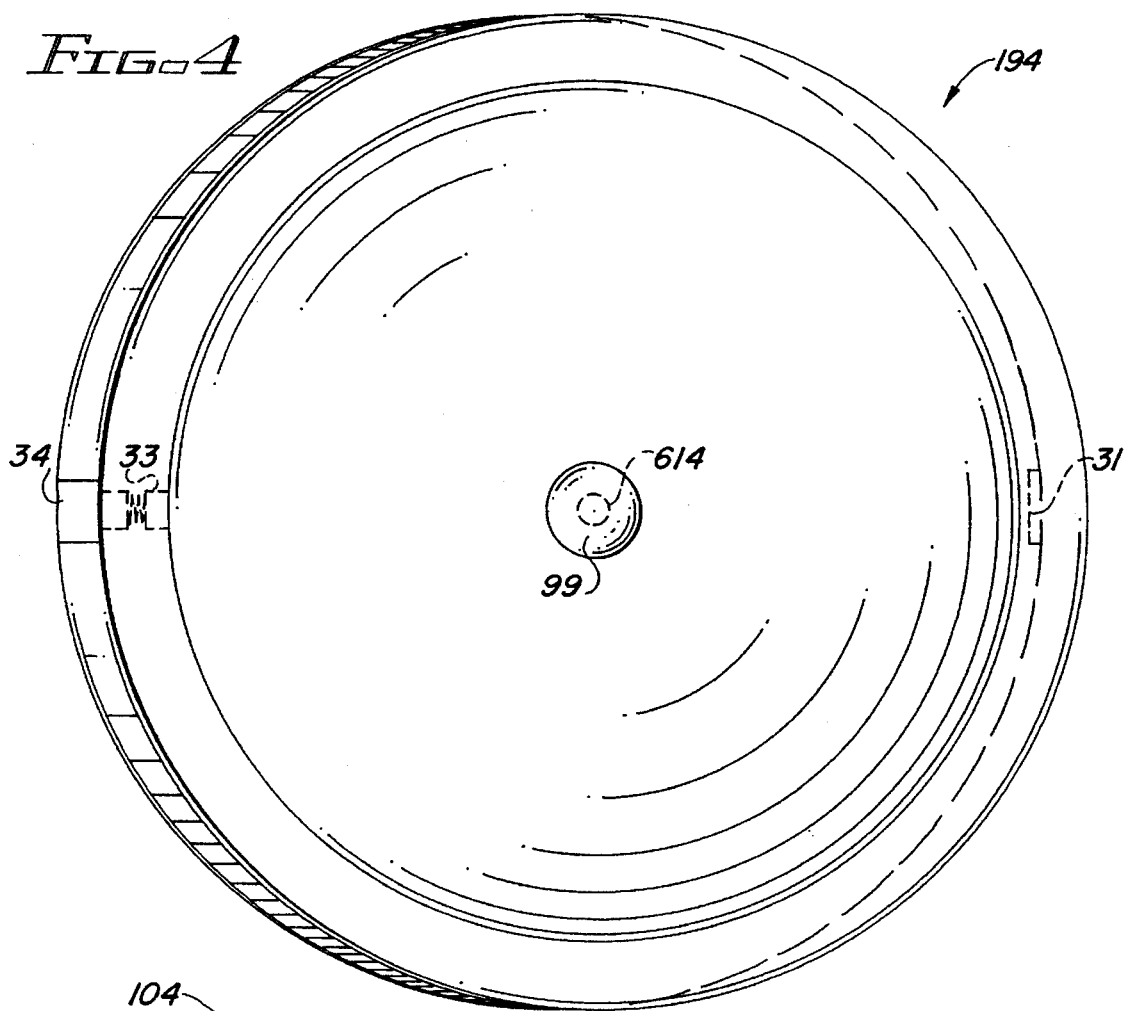
FIG. 4 is a plan view of the tilt mechanism for adjusting the keyboard to various angles.
Figure 5:
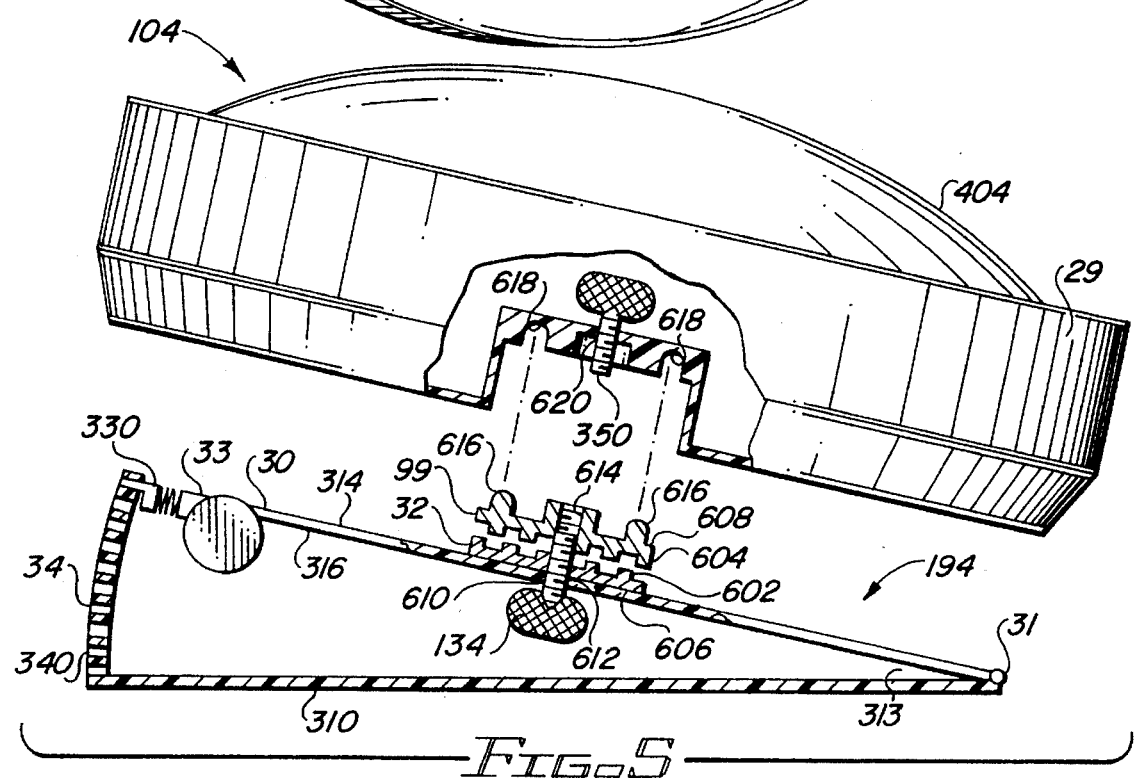
FIG. 5 illustrates a vertical cross-sectional view of the tilt mechanism.

Tilting support units 192 and 194 are identically constructed; therefore, depicting only one of them is sufficient. Plan and cross-sectional side views are shown in FIGS. 4 and 5, respectively. Tilting support unit 194 comprises a substantially flat and circular surface-engaging portion 310 having a first side and a second side, which is connected via hinge means 31 to support plate 314, also substantially flat and circular, at its first side. The second side of surface-engaging portion 310 is integrally connected to arcuate wall 340, which is shaped to permit support plate 314 to move via hinge means 31 through an interior angle 312 ranging from 0 degrees to approximately 30 degrees. Wall 340 further comprises a multiplicity of teeth 34, in the preferred embodiment numbering eleven, affixed to the inner surface of wall 340. Support plate 314 further comprises affixed to its lower surface, that is, the surface 316 facing surface-engaging portion 310, spring-loaded pin device 33. Pin device 33, when not engaged, assumes an extended position such that pin 330 enters a space between two of the teeth 34 and retains support plate 314 in a fixed position. When pin device 33 is engaged, pin 330 is withdrawn from the space between two teeth 34, and support plate 314 is free to be moved to a new angle 312. This angular adjustment allows the user to adjust the tilt of device 104 to an optimal position for each user.

Support plate 314 further comprises a multiposition, locking, rotatable device. This device comprises plates 32 and 99, which have opposing and enmeshable toothed surfaces 602 and 604, respectively, and nonopposing surfaces 606 and 608, respectively. The surface 606 of plate 32 is placed on the top surface 314 of support plate 30 via wing nut 134 threaded through hole 610 in plate 30 and then through hole 612 in plate 32. Toothed surfaces 602 and 604 are engaged, and wing nut 134 is further threaded partially through hole 614 in plate 99, locking the plates 32 and 99 in a particular attitude. Asymmetrically disposed protrusions 616 on surface 608 mate with holes 618 in the bottom surface 298 of device base 29, thus defining a unique locking relationship between tilting unit 194 and device base 29. Unit 194 and base 29 are then coupled via screw 350 threaded through hole 620 in device base 29 and the remaining portion of hole 614 in plate 99. It can be seen that a desirable dome attitude may thus be created for a particular user by releasing screw 350 and wing nut 134 and remeshing surfaces 602 and 604 in any position desired with full 360 degree freedom.

Input device 104 coupled with variable-tilt-angle base 194 can be configured to allow the operator's hands to project forward in an essentially straight line from the arm and wrist. This is in contrast to the conventional keyboard, which requires the hands to be in an offset relationship with respect to the arm in the normal operation of the keyboard. As a result of this design, it is possible to minimize, if not completely eliminate, the strain and stress on the wrist and interconnecting musculoskeletal portions of the wrist, arm, and hands. Additionally, one can anticipate that learning the circular key layout, as well as the dome manipulation technique, will be easier and that accuracy will increase over time.

The design presented herein also allows for another type of dome movement. As described, inserting button 20 locks ball 23 in place (see FIG. 3). Once locked, the dome is allowed only to rock on platform 18. A second type of movement, lateral movement, is achieved by removing button 20 and flipping platform 18 over. Ball 23 is now free to move in chamber 24. This allows for lateral, free movement of the dome 404 on the flat side 184 of platform 18.

It may be found that certain individuals may wish not to tilt the apparatus evenly but to have some slight offset with respect to the location of the apex of the domes. The universal pivot unit and multiposition, locking, rotatable device provides optimizing dome position for any keyboard operator. The assembly is releasable to permit subsequent adjustment to compensate for any improper original adjustment as well as for resetting for other users.

Method of Using the Dual Input Device Embodiment

When the dual input device embodiment is utilized, which is considered the preferred embodiment, keystroke signals are generated in one of two ways: using a single dome to access one of eight keystrokes available from each device, or using a chordal motion. In "chording" a combination of two signals, one from each device 102 and 104 in the apparatus, is translated into a single signal having a unique correspondence with one of a set of keystroke signals. Software means, which are not a part of this invention, are used to effect this translation. Indeed, as this part of the process is software controlled, it can be seen by one skilled in the art that virtually unlimited flexibility is possible in character location and definition, thus enabling the user to create special sets of characters or direct digital control signals as needed.

The generation of keystroke signals will be described with reference to FIGS. 2a and 2b, which depict character definition rings 222 and 224 and their respective sets of available characters.

The method of generating keystroke signals using devices 102 and 104 simultaneously, that is, by "chording," will first be described. Each of these character selector rings 222 and 224 comprises seven concentric rings: six color-coded rings radially divided into eight sectors and one selector ring radially divided into four color-coded sectors, as described in the apparatus section. Rocking one dome into one of the four colored sectors of its selector ring provides half of the "chord" needed to output a keystroke signal, and indicates to the user in a color-coded fashion which set of characters of the correspondingly colored band on the opposite ring will be accessible.

As an example, if "color 1," indicated by the hatched sector of ring 707 in FIG. 2b, is chosen with the right-hand dome 404, the set of characters shown in ring 710 is enabled. Movement of left-hand dome 402 into sector 38 then activates the keystroke uniquely defined by the intersection of sector 38 with the ring colored "color 1," ring 707, the keystroke in this case being the letter "r."

The reverse process also holds: A movement of dome 402 into the sector of selector ring 713 colored "color 5," indicated by dots, makes the character set on ring 705 available. Rocking dome 404 into sector 52 then uniquely outputs the "greater than" symbol, one of eight available characters to be chosen with dome 404, given that dome 402 remains in the sector of "color 5."

It can be seen that, since the selector bands are divided into only four sectors, while the other five rings on each device comprise eight sectors (corresponding to the eight star points), each selector band sector is accessible by rocking the dome into either one of two star point positions. This design has been implemented to enable to user to utilize less precision with one hand than the other. It can further be seen that character definition (which is software controlled) could take into account the user's handedness by placing those characters that are most often used in positions requiring, for instance, less precision with the left hand than the right.

Keystrokes may also be generated by a single device 102 or 104 simply by rocking only one dome 402 or 404 into a star point, leaving the other dome in its "home" position. The characters depicted on ring 708 of selection ring 222 and those on ring 702 of selection ring 224 are available in this way. Again, since the correspondence between the keystroke activated and the signal generated by the apparatus is software controlled, it may be found advantageous to place a distinct set of keystrokes on these outer rings 708 and 702. Such a distinct set might comprise sixteen of the most used letters, a set of function keys such as those corresponding to F1–F10, or even perhaps the set of numerals 0–9 and some operators such as plus and minus. This latter option would be useful were the device frequently to be used in a calculator mode.

It can be seen that in this embodiment there are eighty unique keystrokes available. Activating the switch 85 doubles this number, and, in the most preferred embodiment, the indicia present on character definition rings 222 and 224 would also comprise a second symbol set indicative of the keystrokes that would be generated with the device placed in the "shift" mode. For simplicity this second set of keystroke symbols has been omitted from FIGS. 2a and 2b.

Method of Using the Single Input Device Embodiment

Referring to FIG. 6, the method of using a single input device to output a set of keystrokes will now be described.

Again, keystrokes may be generated either by chording or by a single motion. The set of keystrokes accessible by a single rocking are, as previously, situated on the outermost ring, labeled 735. Thus a rocking of the dome into sector 762 will output the letter "t."

Chording is accomplished by two successive rocking motions of the dome and also involves the switching apparatus located at the base of shaft 82. Specifically, to output the letter "r," for instance, the dome is rocked into the hatched sector located on selector ring 730, corresponding to "color 1," while depressing the dome to activate the switch. With or without releasing the vertical pressure on the switch, the dome is returned to the "home" position and then rocked into sector 761. Hatched ring 732 in sector 761 is seen to correspond to the letter "r."

It can be seen that in this embodiment there are forty unique keystrokes available. Activating the switch 85 doubles this number, and, in the most preferred embodiment, the indicia present on character definition ring 729 would also comprise a second symbol set indicative of the keystrokes that would be generated with the device placed in the "shift" mode. For simplicity this second set of keystroke symbols has been omitted from FIG. 6.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. An interface apparatus comprising:

a base;

means for supporting a human palm, dimensioned substantially to conform to the shape of the human palm under low static muscle load and comprising a dome-shaped member having a lower edge, an upper surface, and a lower surface;

coupling means, movably connecting the palm support means to the base, a movement of the palm support means causing a movement of the coupling means, the coupling means movable between any one of a plurality of keystroke-defining locations and a home location, the coupling means comprising a rodlike member having an upper end and a lower end, the upper end movably connected to the lower surface of the dome-shaped member;

position indicating means coupled to the coupling means for sensing a movement of the coupling means from the home location to a first of the keystroke-defining locations and generating a first location signal indicative of the first keystroke-defining location of the coupling means, the position indicating means comprising:

a support structure affixed to the base;

a spherical member having a bore dimensioned to permit the rodlike member to pass therethrough, the spherical member positioned between the upper end and the lower end of the rodlike member;

a first and a second sway arm, each sway arm having a distal end and a proximal end, each proximal end movably affixed to the support structure, the first and the second sway arm positioned in substantially 90 degree relation to each other, each sway arm having a central curved portion dimensioned to pass beneath and cradle the spherical member;

a first potentiometer, affixed to the distal end of the first sway arm; and a second potentiometer, affixed to the distal end of the second sway arm;

wherein:

a movement of the rodlike member moves the spherical member;

a movement of the spherical member causes a movement of the first and the second sway arm;

a movement of the first sway arm causes the first potentiometer to generate a first potentiometer signal; and a movement of the second sway arm causes the second potentiometer to generate a second potentiometer signal; and means for limiting the movement of the rodlike member shaped to guide the rodlike member over a substantial portion of the movement from the home location to a one of the keystroke-defining locations, the movement limiting means affixed in spaced relation above the base and positioned beneath the dome-shaped member and above the spherical member, the movement limiting means having a star-shaped aperture, the aperture having a plurality of star points, the rodlike member passing through the aperture, wherein the position indicating means further comprises means for determining when the rodlike member has reached a first star point corresponding to the first keystroke-defining location and means for translating the first and the second potentiometer signals into the first location signal when the dome-shaped member is moved sufficiently far to cause the rodlike member to reach one of the star points; and means for receiving the first location signal from the position indicating means and for translating the first location signal into a first keystroke signal having a unique correspondence with the first location signal.

2. The interface apparatus recited in claim 1, wherein the position indicating means further comprises spring means for biasing the rodlike member to return from a keystroke-defining location to the home location.

3. The interface apparatus recited in claim 2, wherein the keystroke signal is one of a first set of keystroke signals, the first set comprising a number determined by the number of star points in the movement limiting means.

4. The interface apparatus recited in claim 3, further comprising switching means wherein the switching means enables access to a second set of keystroke signals, the second set comprising a number determined by the number of star points in the movement limiting means.

5. The interface apparatus recited in claim 4, wherein the switching means are activated by a downward depression and subsequent release of the dome-shaped member.

6. The interface apparatus recited in claim 5, wherein the switching means further enables access to a cursor control function.

7. The interface apparatus recited in claim 6, wherein access to the cursor control function is enabled by two successive downward depressions and releases of the dome-shaped member.

8. The interface apparatus recited in claim 5, wherein a downward depression and a first movement of the dome-shaped member sufficient to generate a first location signal followed by a second movement of the dome-shaped member sufficient to generate a second location signal generates a sum signal, and wherein the interface apparatus further comprises means for translating the sum signal into a keystroke signal having a unique correspondence with the sum signal.

9. The interface apparatus recited in claim 2, wherein the base has a bottom and a wall extending substantially vertically from and surrounding the bottom, the wall and the bottom creating an interior space dimensioned to receive the lower edge of the dome-shaped member.

10. The interface apparatus recited in claim 9, wherein:

the bottom of the base has a circular shape; and the wall of the base comprises:

a first upwardly extending portion integrally connected to the bottom, the first portion making an interior angle greater than 90 degrees with the bottom; and a second upwardly extending portion integrally connected to the first portion, the second portion being substantially vertical.

11. The interface apparatus recited in claim 9, wherein the base of the apparatus further comprises an annulus affixed to the wall, the annulus being positioned above the lower edge of the dome-shaped member, the annulus containing indicia providing a correspondence between a position of the dome-shaped member and a keystroke-defining location of the rodlike member, for determining the corresponding location signal generated by the position indicating means when the dome-shaped member is moved to that position.

12. The interface apparatus recited in claim 1, wherein the base of the apparatus further comprises means for tilting the base about at least one axis.

13. The interface apparatus recited in claim 12, wherein the tilting means comprises:

a tilting support comprising:

a circular bottom having a periphery; a wall having an inner surface and an outer surface, the wall connected along the periphery of the bottom, the wall having a first portion having a first height and a second portion having a second height, the first height being less than the second height, the first portion and the second portion being substantially opposed;

a planar top having a periphery having a first portion and a second portion, the first portion and the second portion being substantially opposed;

hinge means connecting the first portion of the planar top with the first portion of the wall;

a plurality of attachment means affixed to and vertically arrayed on the inner surface of the wall along the second portion of the wall; and means for reversibly attaching the second portion of the top with one of the attachment means; and means for affixing the base to the planar top of the tilting base.

14. The interface apparatus recited in claim 13, wherein the means for affixing the base to the planar top of the tilting support further comprises means for moving the base from a first position to a second position and means for locking the base in second position.

15. The interface apparatus recited in claim 14, wherein:

the coupling means further comprises a second spherical member having a hole, the second spherical member affixed to the upper end of the rodlike member, the hole collinear with and on the opposite side of the second spherical member from the rodlike member;

a hollow receptacle having an aperture is affixed to the lower surface of the dome-shaped member, substantially in the center of the dome-shaped member, the aperture of the hollow receptacle being dimensioned to receive the second spherical member;

the second spherical member is inserted into the receptacle;

the dome-shaped member has a hole substantially in the center, the hole in the dome-shaped member in communication with the receptacle aperture;

the coupling means further comprises a fastener means having a head dimensioned larger than the hole in the dome-shaped member and having an elongated member attached to the head; and the elongated member of the fastener means is inserted into the hole in the dome-shaped member, with the head against the upper surface of the dome-shaped member, the elongated member further being inserted into the hole in the second spherical member to affix the second spherical member to the dome-shaped member.

16. An interface apparatus comprising:

a first and a second input device, each input device comprising:

a device base;

means for supporting a human palm, dimensioned substantially to conform to the shape of the human palm under low static muscle load, the palm support means comprising a dome-shaped member having a lower edge, an upper surface, and a lower surface;

coupling means, movably connecting the palm support means to the device base, a movement of the palm support means causing a movement of the coupling means, the coupling means movable between any one of a plurality of keystroke-defining locations and a home location, the coupling means comprising a rodlike member having an upper end and a lower end, the upper end movably connected to the lower surface of the dome-shaped member; and position indicating means coupled to the coupling means for sensing a movement of the coupling means from the home location to a first keystroke-defining location and generating a first location signal indicative of the first keystroke-defining location of the coupling means, the position indicating means comprising:

a support structure, the support structure affixed to the device base;

a spherical member having a bore dimensioned to permit the rodlike member to pass therethrough, the spherical member positioned between the upper end and the lower end of the rodlike member;

a first and a second sway arm, each sway arm having a distal end and a proximal end, each proximal end movably affixed to the support structure, the first and the second sway arm positioned in substantially 90 degree relation to each other, each sway arm having a central curved portion dimensioned to pass beneath and cradle the spherical member;

a first potentiometer, affixed to the distal end of the first sway arm; and a second potentiometer, affixed to the distal end of the second sway arm;

wherein:

a movement of the rodlike member moves the spherical member;

a movement of the spherical member causes a movement of the first and the second sway arm;

a movement of the first sway arm causes the first potentiometer to generate a first potentiometer signal; and a movement of the second sway arm causes the second potentiometer to generate a second potentiometer signal; and means for limiting the movement of the rodlike member shaped to guide the rodlike member over a substantial portion of the movement from the home location to the first keystroke-defining location, the movement limiting means affixed in spaced relation above the device base and positioned beneath the dome-shaped member and above the spherical member, the movement limiting means having a star-shaped aperture, the aperture having a plurality of star points, the rodlike member passing through the aperture, wherein the position indicating means further comprises means for determining when the rodlike member has reached a first star point corresponding to the first keystroke-defining location and means for translating the first and the second potentiometer signals into the first location signal when the dome-shaped member is moved sufficiently far to cause the rodlike member to reach the first star point; and means for receiving the first location signals from the position indicating means of the first and the second input devices and for translating the first location signals into a first keystroke signal having a unique correspondence with the first location signals from the first and the second input device.

17. The interface apparatus recited in claim 16, wherein the position indicating means further comprises spring means for biasing the rodlike member to return from a one of the keystroke-defining locations to the home location.

18. The interface apparatus recited in claim 17, wherein the keystroke signal is one of a first set of keystroke signals, the first set comprising a number determined by the number of star points in the star-shaped apertures of the first and the second input devices.

19. The interface apparatus recited in claim 18, further comprising a first and a second switching means in communication with the first and the second input devices, respectively, wherein the first and the second switching means enable access to a second set of keystroke signals, the second set comprising a number determined by the number of star points in the star-shaped apertures of the first and the second input devices.

20. The interface apparatus recited in claim 19, wherein the switching means are activated by a downward depression and subsequent release of the dome-shaped member.

21. The interface apparatus recited in claim 20, wherein the switching means further enables access to a cursor control function.

22. The interface apparatus recited in claim 21, wherein access to the cursor control function is enabled by two successive downward depressions and releases of the dome-shaped member.

* * * * *